United States Patent [19]
Köhler et al.

[11] Patent Number: 4,617,061
[45] Date of Patent: Oct. 14, 1986

[54] MIXED PHASES HAVING THE COMPOSITION $BI_{2-x}CR_xO_3$

[75] Inventors: Peter Köhler, Krefeld; Peter Ringe, Bergisch-Gladbach; Heinrich Heine, Krefeld, all of Fed. Rep. of Germany

[73] Assignee: Bayer Aktiengesellschaft, Leverkusen, Fed. Rep. of Germany

[21] Appl. No.: 682,974

[22] Filed: Dec. 18, 1984

Related U.S. Application Data

[62] Division of Ser. No. 511,040, Jul. 5, 1983, Pat. No. 4,529,448.

[30] Foreign Application Priority Data

Jul. 17, 1982 [DE] Fed. Rep. of Germany ....... 3226891
Apr. 30, 1983 [DE] Fed. Rep. of Germany ....... 3315849

[51] Int. Cl.$^4$ ..................... C04B 14/30; C01G 37/14
[52] U.S. Cl. ............................. 106/302; 106/288 B; 423/595
[58] Field of Search ......................... 106/302, 288 B; 423/595

[56] References Cited

PUBLICATIONS

Chem. Abst. #71837a, Crystal Studies of the $Bi_2O_3$—$Cr_2O_3$ System, Masuno, (1970), (vol. 72(14)).
Chem. Abst. #177845x, "Crystal Phases of Nonohomic Zinc Oxide Ceramics", Inada, (1978), (vol. 88(24)).
Chem. Abstract #205154y (vol. 98), Synthesis and Properties of Phases in the Bismuth Trioxide Chromium Trioxide System, Zhitomirskii et al.

*Primary Examiner*—John Kight
*Assistant Examiner*—Garnette D. Draper
*Attorney, Agent, or Firm*—Sprung Horn Kramer & Woods

[57] ABSTRACT

Yellow to orange-red bismuth oxide-chromium oxide mixed phase pigments having a specific surface from about 1 to 10 m$^2$/g and the composition $Bi_{2-x}Cr_xO_3$ wherein x is from about 0.05 to 0.5 are produced by mixing the appropriate quantities of finely disperse bismuth-(III)— and chromium-III— or chromium-(VI)-compounds, calcining the mixture in air at a temperature from about 500° to 800° C. and subsequently grinding. The products are suitable for pigmenting lacquers, plastics and dispersion dyes.

2 Claims, No Drawings

MIXED PHASES HAVING THE COMPOSITION $Bi_{2-x}Cr_xO_3$

This is a division of application Ser. No. 511,040, filed July 5, 1983, now U.S. Pat. No. 4,529,448.

This invention relates to yellow to orange-red bismuth oxide/chromium oxide mixed phases having the composition $Bi_{2-x}Cr_xO_3$ ($0.05 \leq x \leq 0.5$) with specific surfaces of from 1.0 to 10 $m^2/g$, and to a process for their production in pigment quality.

Pure bismuth trioxide ($Bi_2O_3$) exists in four different modifications. Of these, only the $\alpha$-phase is stable at room temperature, $\delta$-$Bi_2O_3$ is obtained as the high-temperature phase at temperatures in the range of from 717° to 825° C. while $\delta$-$Bi_2O_3$ and $\gamma$-$Bi_2O_3$ are metastable (Gmelins Handbuch der anorganischen Chemie, Vol. 19, page 629 (1964) 8th Edition).

After cooling, the tetragonal $\beta$-phase and the cubic $\gamma$-phase can be stabilized at room temperature by the addition of metal oxides, such as for example $Sb_2O_3$, $Al_2O_3$, $Ga_2O_3$, $In_2O_3$, $Y_2O_3$, $Fe_2O_3$, $Cr_2O_3$, $ZrO_2$, $SiO_2$ or $GeO_2$, to the $Bi_2O_3$-melt (G. Gattow, H. Schröder; Z. anorg. allg. Chem. 318 (1962), page 176).

DE-AS 1592388 describes the mixed phase formation of $Bi_2O_3$ with a plurality of 1- to 6-valent metal oxides by the calcination of homogeneous mixtures of corresponding components, the various modifications of $Bi_2O_3$ being obtained according to the chemical composition. Although the $\beta$-phase of $Bi_2O_3$, is stabilized by the incorporation of $Cr_2O_3$, which is tomato-red in color, these products do not have the necessary particle sizes to be able to be used as pigments.

An object of the present invention is to enable brilliant bismuth oxide/chromium oxide mixed phases having the composition $Bi_{2-x}Cr_xO_3$ to be obtained in pigment quality by a simple and economic process.

It has now surprisingly been found that bismuth oxide/chromium oxide mixed phases can be obtained in pigment quality providing they have a $Cr_2O_3$-content of from 0.8 to 9.7% by weight.

Accordingly, the present invention relates to bismuth oxide/chromium oxide mixed phases having the composition $Bi_{2-x}Cr_xO_3$ with specific surfaces of from 1.0 to 10 $m^2/g$ and values for x of from 0.05 to 0.5.

Particularly favorable colorimetric data are shown by pigments according to the invention which have specific surfaces of from 1.5 to 8 $m^2/g$. The BET-surface is determined by the $N_2$-method in accordance with DIN 661 131.

The present invention also relates to a process for the production of the pigments according to the invention which is characterized in that appropriate quantities of finely disperse bismuth-(III)- and chromium-(III)- or chromium-(IV)-compounds are mixed, calcined in air at temperatures in one step in the range of from 500° to 800° C. and subsequently ground.

It is surprising that yellow to orange-red mixed phase pigments characterized by high color purity are obtained by this simple process.

Suitable bismuth components are bismuth hydroxide and basic bismuth carbonate which can be prepared, according to the prior art, by precipitating bismuth-III-nitrate solutions with alkali metal hydroxides and/or alkali metal carbonates. In this process however the problem of a high content of salts in the effluent (alkali metal nitrates) has to be overcome.

Surprisingly oxidic bismuth compounds which are excellently suitable for the synthesis of pigments can be obtained without the formation of soluble salts when metallic bismuth powder is intensively dispersed in an aqueous suspension at temperatures between 20° and 100° C. with known stirring apparatuses such as bead mills, dissolvers or Kotthoff mixing sirens. Suitable bismuth metal powders are either obtained by mechanical comminution of bismuth bars in ball mills or mortar mills or by spraying a bismuth melt into water, it being possible for the portion with the preferred grainsize of $<100$ $\mu m$ to be separated off by screening. Depending on the particle size of the metal powder and the height of the temperature the conversion into the bismuth-/oxygen compounds can take different lengths of time. Gassing with air, air/oxygen mixtures and/or oxygen accelerates this process in the same way as the use of finely-divided bismuth powder.

Bismuth oxide ($Bi_2O_3$), which has been calcined only once, yields pigments of considerably poorer pigment quality is less suitable as the bismuth raw material.

Suitable chromium sources are $Cr_2O_3$ (BET-surfaces $>2.5$ $m^2/g$) $CrO_3$, $CrOOH$ (BET-surfaces $>5$ $m^2/g$), Cr-(III)-acetate (BET-surfaces $>5$ $m^2/g$) and precipitated Cr-(III)-hydroxides (BET-surfaces $>10$ $m^2/g$).

The mixing of the respective components can be carried out both in the dry state and in the moist state, in mixing apparatuses such as, for example, intensive mixers, mills kneaders, screws or stirrer-equipped vessels.

If oxidic bismuth compounds, which are obtainable by intensively dispersing finely-divided bismuth metal powder in an aqueous suspension, are used as starting materials for the preparation of the raw-material mixture the Cr compounds required can be added to the same dispersing apparatus during or after the bismuth metal conversion. This is followed by filtration and drying of the raw material mixture.

A further method of preparing homogenous raw-material mixtures is the co-precipitation of bismuth-III-hydroxides and chromium-III hydroxides in the required quantitative ratios by the common precipitation of a bismuth-(III)-nitrate solution and chromium-(III)-salt solution (for example Cr-(III)-nitrate or Cr-(III)-acetate in $HNO_3$) with alkali metal hydroxides or alkali metal carbonates at pH-values above 7.0. The product obtained after filtration is washed free from nitrate, resulting in the formation of homogeneous raw-material pastes having solids contents of from 30 to 50%.

The moist pastes obtained may be dried by means of spray dryers, drying cabinets, cylinder dryers and belt dryers. Size-reduction to homogeneous powder mixtures (residual moisture content up to about 5% by weight) may be carried out in pinned-disc mills, ball mills, bowl mills or similar units.

Granulate or pellets may be produced from the moist raw-material mixture during drying by means of screws, cylinder dryers or appropriate granulating machines (residual moisture content up to 30% by weight).

The moist paste may also be directly used for calcination, in which case its moisture content should not exceed 35% by weight for economic reasons.

Calcination of the raw-material mixtures (powder, granulate or moist paste) may be carried out in air in directly or indirectly heated furnaces with or without circulation of the product. Suitable calcining units are, for example, chamber furnaces, muffle furnaces, rotating drum furnaces, rotating tube furnaces or swivel hearth furnaces.

After calcination, the products are subjected to preliminary dry size-reduction (for example in mortar mills) and then to wet grinding in vibrating sand or ball mills (grinding time between 5 minutes and 3 hours). After wet grinding, the product is filtered, washed, dried at 105° C. and deagglomerated in a mill.

The particle sizes of the bismuth oxide/chromium oxide mixed phase pigments are largely controllable through the intensity of the calcination temperature (500°–750° C.). The products obtained have specific surfaces of from 1.0 to 10 $m^2/g$ (as determined by the BET-method in accordance with DIN 661 131).

All the mixed phases are pure according to X-ray photography and have the structure of $\beta$-$Bi_2O_3$ (Examples 1 to 12).

The reaction of homogeneous mixtures of $Bi_2O_3$ and $CrO_3$ or $Cr_2O_3$ at temperatures of 750° C., involving calcination only once in a rotating tube furnace, gives distinctly poorer end products (brown-orange colors, in some cases dirty) than the process according to the invention which is clear proof of the advance over the process described in DE-OS 1592388.

The orange-red to yellow bismuth oxide/chromium oxide mixed phase pigments with specific surfaces of preferably from 1.5 to 8 $m^2/g$ produced in accordance with the invention are suitable for pigmenting lacquers, plastics and dispersion dyes.

The invention is illustrated by the following examples:

EXAMPLE 1

222.39 g of powdered metallic bismuth were dissolved in 450 ml of 64.5% nitric acid and the resulting solution was adjusted to a pH-value of approximately 1.5 by the addition of 1.5 liters of water at room temperature, followed by the addition with stirring of 10.91 g of $Cr(NO_3)_3.9H_2O$ (5-liter stirrer equipped vessel). Precipitation was carried out with 50% KOH at room temperature up to a pH-value of approximately 10. After homogenization for 30 minutes (mixing siren), the product was filtered and washed free from nitrate and the light green paste obtained was dried at 105° C. and size-reduced in a ball mill.

Quantities of one-eighth of the raw-material mixture were calcined in air for 1 hour in a muffle furnace at 500° C., 575° C. and 725° C. Five-eights of this mixture were calcined for 1 hour at 650° C. in the same way as described above. All the calcines obtained were ground for 10 minutes in a mortar mill, their colors varying from yellow-orange (calcination at 500° C.) to red-orange (calcination at 725° C.).

Chemical analysis showed that the products had the composition $Bi_{1.95}Cr_{0.05}O_3$ (0.8±0.05% $Cr_2O_3$; 99.0±0.1% $Bi_2O_3$).

The batch calcined at 650° C. was subsequently wet-ground with varying intensity, the following results being obtained:

| Grinding | Color | BET-surface $m^2/g$ |
| --- | --- | --- |
| 10 mins. Wedag mill | orange-red | 1.0 |
| 10 mins. Wedag mill + 1 h vibrating ball mill (wet) | orange | 1.4 |
| 10 mins. Wedag mill + 3 h vibrating ball mill (wet) 10 mins. Wedag mill + 1 h sand mill (wet) | Yellow-orange | 3.9 |

EXAMPLE 2

212.05 g of powdered metallic bismuth were dissolved in 425 ml of 64.5% nitric acid and the resulting solution was adjusted to a pH-value of 1.5 by the addition of 1.5 liters of water at room temperature, followed by the addition with stirring of 71.65 g of $Cr(NO_3)_3.9H_2O$ (5-liter stirrer-equipped vessel). The precipitation and further processing of the hydroxide paste were carried out in the same way as in Example 1.

The powder-form raw-material mixture (residual moisture <5%) was divided into quarters which were then calcined in air for 1 hour in a muffle furnace at temperatures of 500°, 575°, 650° and 725° C., respectively.

After the calcines had been ground in a mortar mill (10 minutes), the mixed phases were stirred in water for 30 minutes at room temperature (<20% solids contents), filtered, washed, dried and deagglomerated.

According to chemical analysis, the products had the composition $Bi_{1.7}Cr_{0.3}O_3$ (5.30±0.15% $Cr_2O_3$; 94.60±0.2% $Bi_2O_3$). The dependence of the color and the BET-surface on the calcination temperature is shown in the following Table:

| Calcination temperature | Color | BET-surface $m^2/g$ |
| --- | --- | --- |
| 500 | yellow-orange | 4.5 |
| 575 | light orange | 3.1 |
| 650 | orange | 1.6 |
| 725 | orange-red | 1.0 |

EXAMPLE 3

508.90 g of powdered metallic bismuth were dissolved in 1 liter of 64.5% nitric acid and the resulting solution was adjusted to a pH-value of 1.5 by the addition of 3.5 liters of water at room temperature, followed by the addition with stirring of 171.90 g of $Cr(NO_3)_3.9H_2O$ (10-liter stirrer-equipped vessel). The precipitation and further processing of the hydroxide paste was carried out in the same way as in Example 1.

The powder-form raw material mixture (residual moisture content <3%) was divided into two halves which were calcined in a muffle furnace for 1 hour at 575° and 725° C., respectively, and then ground with varying intensity as shown in the following table. After filtration, washing and drying, chemical analysis showed that the products had the composition $Bi_{1.7}Cr_{0.3}O_3$ (5.35±0.15% of $Cr_2O_3$; 94.50%±0.3 of $Bi_2O_3$).

The color assessment and specific surfaces of the differently calcined and differently ground mixed-phase pigments are also shown in the table:

| Calcination temperature °C. | Grinding | Color | BET-surface m²/g |
|---|---|---|---|
| 575 | 30 mins mortar mill | | 6.2 |
| | 5 mins mortar mill | | 6.2 |
| | 1 h vibrating ball mill | | |
| | 5 mins mortar mill | yellow orange | 5.6 |
| | 3 h vibrating ball mill | | |
| | 5 mins mortar mill | | 7.2 |
| | 1 h sand mill | | |
| 725 | 30 mins mortar mill | orange-red | 1.0 |
| | 5 mins mortar mill | orange | 1.5 |
| | 1 h vibrating ball mill | | |
| | 5 mins mortar mill | light orange | 2.7 |
| | 3 h vibrating ball mill | | |
| | 5 mins mortar mill | yellow-orange | 5.8 |
| | 1 h sand mill | | |

EXAMPLE 4

In a 10-liter stirrer-equipped vessel, 94.01 g of Cr-(III)-acetate (29.1% of $Cr_2O_3$) are dissolved in 400 ml of 65.8% $HNO_3$ and 3.1 liters of water are added to the resulting solution, followed by the introduction with stirring of 1006.96 g of $Bi(NO_3)_3.5H_2O$ (room temperature). The solution had a pH-value of 1.5 and was adjusted to a pH-value of approximately 8 by the addition over a period of 15 minutes at room temperature of a 31.5% KOH-solution. A green suspension was formed and was stirred for 30 minutes at pH ~8, followed by further processing in the same way as in Example 1.

The powdered raw-material mixture was calcined in air both in a muffle furnace and also in a rotary kiln (in each case for 2 hours at 750° C.) and the calcines obtained were ground for 5 minutes in a sand mill without preliminary size reduction.

After filtration, washing and drying at 105° C., orange to orange-red mixed-phase pigments are obtained with the composition $Bi_{1.7}Cr_{0.3}O_3$ (5.30±0.15% of $Cr_2O_3$, 94.50±0.1% of $Bi_2O_3$) and with BET-surfaces of 1.2±0.1 m²/g.

EXAMPLE 5

355.3 g of powdered metallic bismuth were dissolved with 677 ml of ~60% $HNO_3$ in a 5-liter stirrer-equipped vessel (temperature increase to approximately 55° C.), after which the clear Bi-(III)-nitrate solution was adjusted to a pH-value of 7 by the addition over a period of 60 minutes of an approximately 30.5% KOH-solution. The white suspension of Bi-hydroxide was stirred for another 30 minutes, the mother liquor removed by decantation and 29.27 g of $Cr_2O_3$ (in the form of a 77.8% filter paste) were mixed in over a period of 10 minutes using a Kotthoff mixing siren. The suspension was filtered, washed free from nitrate and, after drying, size-reduced to form a homogeneous powder.

Calcination of the raw-material mixture was carried out in air at 750° C. in a rotating tube furnace and lasted 2 h and 16 h, respectively (gradual heating of the mixture from room temperature to the final temperature). The calcines were wet-ground for 5 minutes in a sand mill without preliminary size-reduction, filtered, washed, dried at 105° C. and deagglomerated.

The end products obtained were orange mixed-phase pigments having the composition $Bi_{1.7}Cr_{0.3}O_3$ (5.25±0.15% of $Cr_2O_3$; 94.60±0.2% of $Bi_2O_3$). The BET-surfaces measured 1.4±0.1 m²/g.

EXAMPLE 6

A Bi-hydroxide-suspension was prepared in the same way as in example 5, after which 35.51 g of Cr-hydroxide (65.2% of $Cr_2O_3$) were mixed in and the mixture was processed in the same way as in Example 5. Grinding and working up in the usual way gave orange mixed-phase pigments having the composition $Bi_{1.7}Cr_{0.3}O_3$ (5.30±0.2% of $Cr_2O_3$; 94.6±0.25% of $Bi_2O_3$) with BET-surfaces of 1.5±0.1 m²/g.

EXAMPLE 7

0.897 kg of $CrO_3$ (99%, Merck) were dissolved in 10 liters of water and 13.150 kg of basic bismuth carbonate (90.1% of $Bi_2O_3$,) were added in portions while stirring together with another 7.5 liters of water (30-liter stirrer-equipped vessel+Kotthoff mixing siren). The suspension was homogenized for 1 hour (pH-value ~2.5; solids content <50%) and then dried on metal plates at 105° C. to a residual moisture content of less than 2%. Size reduction to powder form was carried out in a dry mill. Half the raw-material mixture was then calcined for 4 h at 750° C. in a muffle furnace (porcelain crucible) and the other half was reacted for 4 hours at 750° C. in a rotary kiln.

The calcines were subjected to dry preliminary size reduction (15 minutes in a mortar mill), wet-ground for 5 minutes in a sand mill, filtered, washed and dried at 105° C.

6.1 kg of an orange mixed-phase pigment having the composition $Bi_{1.7}Cr_{0.3}O_3$ (5.4±0.1% of $Cr_2O_3$; 94.5±0.1% of $Bi_2O_3$) were obtained in each case. The specific BET-surfaces measured 1.9±0.1 m²/g.

EXAMPLE 8

447.03 g of basic bismuth carbonate (88.6% of $Bi_2O_3$) and 29.74 g of chromium oxide filter refuse (77.9% of $Cr_2O_3$) were intensively mixed with 500 ml of water in a Kotthoff mixing siren (solids content approximately 48%) and adjusted to a pH-value of 2.5 with a little $HNO_3$.

After the paste had been dried (at 105° C. in a drying cabinet) and size-reduced, the homogeneous powder obtained was calcined in air in a rotating tube furnace at temperatures of 700° and 750° C., respectively (2 h).

The calcines were subjected to dry preliminary size reduction (15 minutes in a mortar mill) and then wet-ground for 5 minutes in a sand mill, followed by filtration, washing and drying at 105° C.

The orange colored bismuth oxide/chromium oxide mixed phase pigments had the composition $Bi_{1.7}Cr_{0.3}O_3$ (5.35±0.1% of $Cr_2O_3$; 94.4±0.1% of $Bi_2O_3$) and specific BET-surfaces of 1.8±0.1 m²/g.

EXAMPLE 9

202.25 g of metallic finely powdered bismuth were dissolved in 400 ml of 64.5% $HNO_3$ in a 5-liter stirrer-equipped vessel and the resulting solution was adjusted to a pH-value of 1.5 by the addition of approximately 1.5 liters of water at room temperature. 129.08 g of $Cr(NO_3)_3.9H_2O$ were introduced into the clear Bi-(III)-nitrate solution and the pH-value of the solution was then increased to 10 by the addition of 50% KOH at room temperature. A green suspension was formed and, after homogenization for 30 minutes, the product was filtered, washed (until free from nitrate), dried at 105° C. and size-reduced to a homogeneous powder.

The raw-material mixture was divided into 3 equal parts which were calcined for 1 hour in air in a muffle furnace at temperatures of 575°, 650° and 725° C., respectively, subjected to dry preliminary size reduction for 10 minutes and then wet-ground in a sand mill for 60 minutes. The mixed phase pigments described in the following table were obtained after filtration, washing and drying (composition $Bi_{1.5}Cr_{0.5}O_3$ (9.70±0.1% of $Cr_2O_3$, 90.0±0.1% of $Bi_2O_3$):

| Calcination and grinding | Color | BET-surface $m^2/g$ |
|---|---|---|
| 1 h at 575° C. 60 mins sand mill | yellow | 9.2 |
| 1 h at 650° C. 60 mins sand mill | | 8.1 |
| 1 h at 725° C. 60 mins sand mill | golden yellow | 8.3 |

EXAMPLE 10

568,42 g of bismuth metal powder <40 μm 99.99% purity and 6 l of water were stirred with a Kotthoff mixing siren (2800 r.p.m.) in a 100 l glass tube, with the introduction of oxygen, for 4 h at about 70° C. 48.00 of $CrO_3$ were added to the yellowish white suspension formed after 4 h and the mixture was homogenised for a further 4 h with the Kotthoff mixing siren at ~70° C. The orange-brown raw material mixture was filtered, dried at 105° C. and pulverised in a mill.

150 g portions of this raw-material mixture were calcined in air in a rotating tube furnace under the following conditions:

(a) 150 g of the mixture were heated from room temperature to 750° C. within 6 h and left at the final temperature for 3 h.
(b) 150 g of the mixture were introduced directly into the hot furnace and left for 6 h at 750° C.
(c) 150 g of the mixture were introduced directly into the hot furnace and left for 16 h at 750° C.
(d) 150 g of the mixture were introduced directly into the hot furnace and left for 32 h at 750° C.

The calcination products were subjected to dry preliminary size reduction (minutes in a mortar mill) wet-ground for 5 minutes in a stirred-equipped ball mill at 1500 r.p.m., filtered, washed and dried at 105° C.

A description of the products can be found in the following table:

| Calcination conditions | Colour | BET-surface $m^2/g$ |
|---|---|---|
| (a) from room temp. to 750° C. 3 h at 750° C. | | 1.9 |
| (b) directly in the hot furnace 6 h at 750° C. | orange red | 1.8 |
| (c) directly in the hot furnace, 16 h at 750° C. | | 1.6 |
| (d) directly in the hot furnace, 32 h at 750° C. | | 1.6 |

These mixed phases are shown by chemical analysis, to have the following following composition: $Bi_{1.7}Cr_{O.3}O_3$ with 4.5±0.15% $Cr_2O_3$ and 94.6±0.2% $Bi_2O_3$.

EXAMPLE 11

71.06 g of bismuth metal powder (<40 μm, 99.99% purity) and 4.606 g of $Cr_2O_3$ (99.5% purity) were dispersed in a stirrer-equipped ball mill with water for 3 h at 72° C. and 1500 r.p.m. with gassing using oxygen. The light green suspension was filtered, dried and calcined in air in a rotating tube furnace for 6 h at 750° C.

Following calcination the batch was subjected to dry preliminary size reduction (5 minutes in a mortar mill), wet-ground in a stirrer-equipped ball mill (5 minutes at 1500 r.p.m.), filtered washed and dried.

The end product obtained was an orange-yellow mixed phase having the composition $Bi_{1.7}Cr_{O.3}O_3$ (5.3% $Cr_2O_3$; 94.5% $Bi_2O_3$) and specific surface of 4 $m^2/g$.

EXAMPLE 12

518.32 g of bismuth metal powder (<40 μm; 99.99% purity) were converted into bismuth hydroxide following the same procedure as in Example 10 and 70.72 g $CrO_3$ (99%) were then added. After homogenising the mixture for 4 hours in the same apparatus an orange-coloured suspension was formed which was filtered, washed and dried at 105°.

The dried raw-material mixture was divided into a powder and calcined as follows in air in a rotating kiln:
(a) 300 g were calcined for 6 h at 600° C., having been, directly introduced into the hot furnace.
(b) 300 g were calcined for 6 h at 650° C., having been directly introduced into the hot furnace.

The calcination produces were subjected to dry preliminary size reduction (5 minutes in a mortar mill), wet-ground in a stirrer-equipped ball mill (5 mins. at 1500 r.p.m.), filtered, washed and dried at 105° C.

The mixed phases have the composition $Bi_{1.55}Cr_{O.45}O_3$ and can be described as follows:

| Calcination conditions | colour | BET-Surface $m^2/g$ |
|---|---|---|
| (a) 6 h at 600° C. | yellow | 3.4 |
| (b) 6 h at 650° C. | golden yellow | 2.5 |

EXAMPLE 13 a. 796.11 g of $Bi_2O_3$ (99.5%) and 60.60 g of $CrO_3$ (99.0%) were processed with 250 ml of water in a Kotthoff mixing siren to form a homogeneous paste (solids content approximately 75%, pH-value 6). After the raw material mixture had been dried (105° C.) and size-reduced, the fine powder obtained was calcined in a rotating tube furnace (for 2 hours at 750° C.). The calcine was ground for 5 minutes in a sand mill, filtered, washed and dried.

According to analysis, the brownish-orange end product had the composition $Bi_{1.7}Cr_{0.3}O_3$ (5.30% of $Cr_2O_3$; 94.50% of $Bi_2O_3$).

b. 796.11 g of $Bi_2O_3$ (99.5%) and 58.56 g of chromium oxide paste (77.9% of $Cr_2O_3$) were mixed, calcined and worked up in the same way as in Example a.

The end product was brown-orange in color with tinges of olive and had the composition $Bi_{1.7}Cr_{0.3}O_3$ (5.40% of $Cr_2O_3$, 94.40% of $Bi_2O_3$).

In both cases, the use of the $Bi_2O_3$ led to products of inferior pigment quality.

It will be appreciated that the instant specification and examples are set forth by way of illustration and not limitation, and that various modifications and changes may be made without departing from the spirit and scope of the present invention.

What is claimed is:
1. A bismuth oxide-chromium oxide mixed phase pigment having a specific surface from about 1 to 10 $m^2/g$ and the composition $Bi_{2-x}Cr_xO_3$ wherein x is from about 0.05 to 0.5.
2. A bismuth oxide-chromium oxide mixed phase pigment according to claim 1, having a specific surface from about 1.5 to 8 $m^2/g$.

* * * * *